US008880368B2

(12) United States Patent
Hewitt et al.

(10) Patent No.: US 8,880,368 B2
(45) Date of Patent: Nov. 4, 2014

(54) ELECTRIC POWER SYSTEM WAVEFORM SEARCH

(71) Applicant: Schweitzer Engineering Laboratories, Inc., Pullman, WA (US)

(72) Inventors: Eric J Hewitt, Moscow, ID (US); Gregory C. Zweigle, Pullman, WA (US); Stanley P Gotshall, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 67 days.

(21) Appl. No.: 13/795,586

(22) Filed: Mar. 12, 2013

(65) Prior Publication Data

US 2013/0346419 A1    Dec. 26, 2013

Related U.S. Application Data

(60) Provisional application No. 61/662,854, filed on Jun. 21, 2012.

(51) Int. Cl.
  *G01R 13/00*    (2006.01)
  *G06F 17/30*    (2006.01)

(52) U.S. Cl.
  CPC .............................. *G06F 17/30613* (2013.01)
  USPC ........................................................ 702/66

(58) Field of Classification Search
  CPC ........ G01R 22/10; G01R 13/00; G01D 4/004; Y02B 90/242; Y04S 20/322
  USPC ..................................... 702/66, 64, 182–185
  See application file for complete search history.

(56) References Cited

U.S. PATENT DOCUMENTS

| 3,164,771 | A | 1/1965 | Milford |
| 3,258,692 | A | 6/1966 | Jacomini |
| 3,264,633 | A | 8/1966 | Heller |
| 3,266,018 | A | 8/1966 | Higgins |
| 3,313,160 | A | 4/1967 | Goldman |
| 4,794,386 | A | 12/1988 | Bedrij |
| 4,845,644 | A | 7/1989 | Anthias |

(Continued)

FOREIGN PATENT DOCUMENTS

| WO | 2005015366 | 2/2005 |
| WO | 2006052215 | 5/2006 |

OTHER PUBLICATIONS

PCT/US13/45019 Patent Cooperation Treaty International Search Report and Written Opinion of the International Searching Authority mailed Dec. 30, 2013.

(Continued)

*Primary Examiner* — Edward Raymond
(74) *Attorney, Agent, or Firm* — Jared L. Cherry

(57) ABSTRACT

The present disclosure relates to searching electric power system waveforms. Disclosed herein are various systems and methods for improving search performance through indexing electric power system waveforms using waveform attributes such as frequency, amplitude, angle, rate of change, and the like. According to some embodiments, multiple indexes may be used together to find information of interest. A reference signal may be utilized according to some embodiments. Normalizing a plurality of waveforms using a reference signal may facilitate the use of an index for comparing two arbitrary waveforms. This disclosure also relates to detecting and indexing islanding conditions in an electric power system. Various embodiments may utilize information relating to islanding conditions in connection with search operations.

33 Claims, 11 Drawing Sheets

(56) References Cited

U.S. PATENT DOCUMENTS

| | | |
|---|---|---|
| 5,519,861 A | 5/1996 | Ryu |
| 5,594,847 A | 1/1997 | Moursund |
| 5,793,750 A | 8/1998 | Schweitzer |
| 5,917,483 A | 6/1999 | Duncan |
| 5,930,773 A | 7/1999 | Crooks |
| 5,943,656 A | 8/1999 | Crooks |
| 6,035,285 A | 3/2000 | Schlect |
| 6,052,671 A | 4/2000 | Crooks |
| 6,088,688 A | 7/2000 | Crooks |
| 6,229,536 B1 | 5/2001 | Alexander |
| 6,313,752 B1 | 11/2001 | Corrigan |
| 6,559,868 B2 | 5/2003 | Alexander |
| 6,618,648 B1 | 9/2003 | Shirota |
| 6,642,700 B2 | 11/2003 | Slade |
| 6,662,124 B2 | 12/2003 | Schweitzer |
| 6,754,597 B2 | 6/2004 | Bertsch |
| 6,845,333 B2 | 1/2005 | Anderson |
| 6,898,488 B2 | 5/2005 | Kusaka |
| 6,907,368 B2 | 6/2005 | Bechtold |
| 6,947,269 B2 | 9/2005 | Lee |
| 6,973,376 B2 | 12/2005 | Kusaka |
| 7,073,182 B1 | 7/2006 | Osburn |
| 7,127,329 B2 | 10/2006 | Kusaka |
| 7,185,281 B2 | 2/2007 | Farago |
| 7,298,259 B2 | 11/2007 | Moriwaki |
| 7,403,114 B2 | 7/2008 | Moriwaki |
| 7,660,683 B2 | 2/2010 | Cuthbertson |
| 2001/0021896 A1 | 9/2001 | Bertsch |
| 2002/0080149 A1 | 6/2002 | Alexander |
| 2002/0126157 A1 | 9/2002 | Farago |
| 2002/0145517 A1 | 10/2002 | Papallo |
| 2002/0159051 A1 | 10/2002 | Guo |
| 2003/0105608 A1 | 6/2003 | Hart |
| 2004/0111187 A1 | 6/2004 | Kusaka |
| 2005/0033481 A1 | 2/2005 | Budhraja |
| 2005/0114500 A1 | 5/2005 | Monk |
| 2005/0132241 A1 | 6/2005 | Curt |
| 2005/0143947 A1 | 6/2005 | James |
| 2005/0203670 A1 | 9/2005 | Kusaka |
| 2005/0273183 A1 | 12/2005 | Curt |
| 2006/0095276 A1 | 5/2006 | Axelrod |
| 2006/0161645 A1 | 7/2006 | Moriwaki |
| 2006/0202834 A1 | 9/2006 | Moriwaki |
| 2006/0224336 A1 | 10/2006 | Petras |
| 2006/0259255 A1 | 11/2006 | Anderson |
| 2007/0171052 A1 | 7/2007 | Moriwaki |
| 2007/0198708 A1 | 8/2007 | Moriwaki |
| 2010/0324845 A1 | 12/2010 | Spanier |
| 2014/0100801 A1* | 4/2014 | Banhegyesi et al. ............ 702/61 |

OTHER PUBLICATIONS

Ray Klump, et al. Visualizing Real-Time Security Threats using Hybrid SCADA/PMU Measurement Displays, 38th Hawaii International Conference, IEEE No. 0-7695-2268-8/2005.

T.W. Cease, Real-Time Monitoring of the TVA Power System ISSN 0865-0156/94—1994 IEEE.

D.T. Rizy—Evaluation of Distribution Analysis Software for DER Applications, Oak Ridge National Laboratory—Sep. 30, 2002.

* cited by examiner

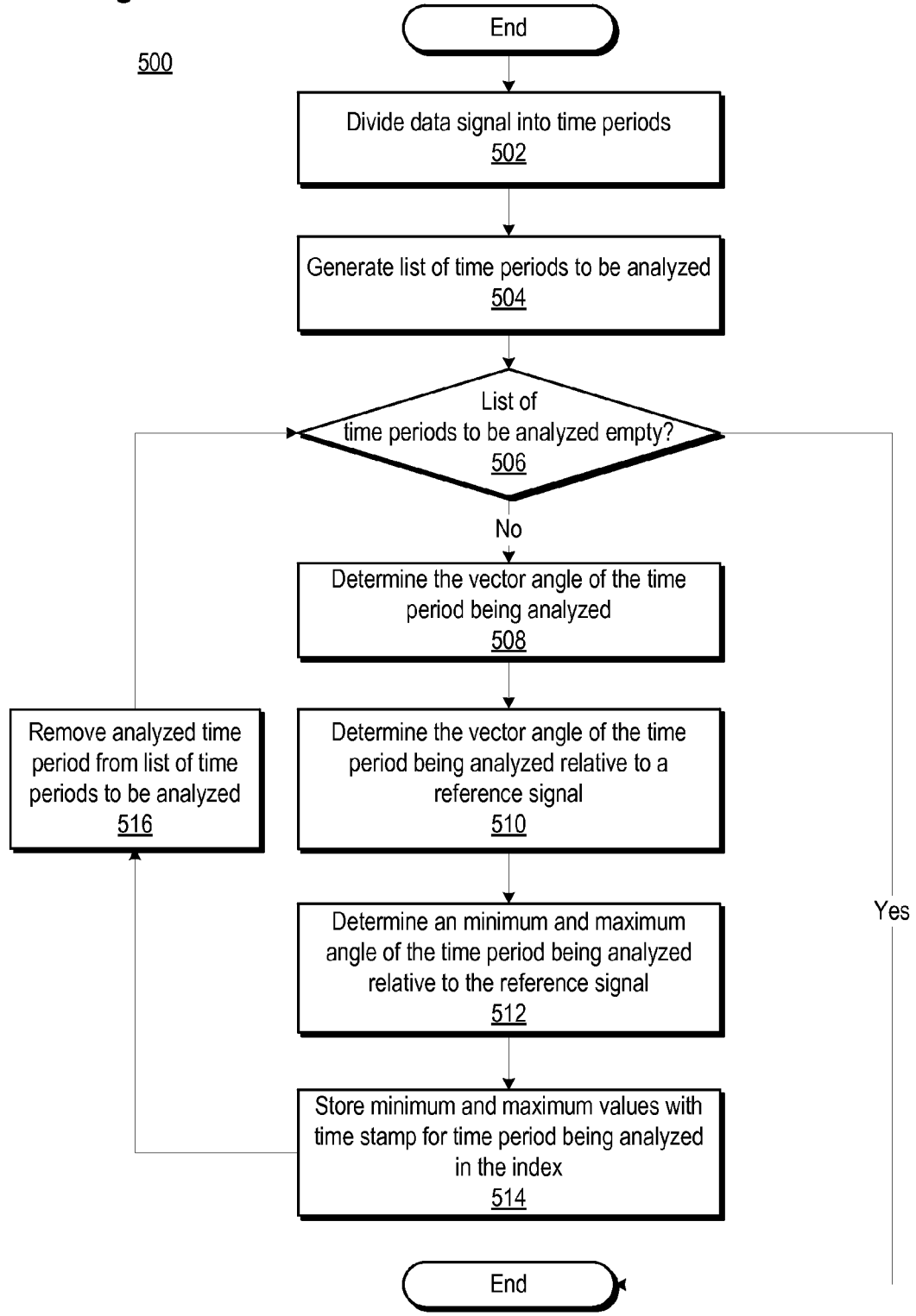

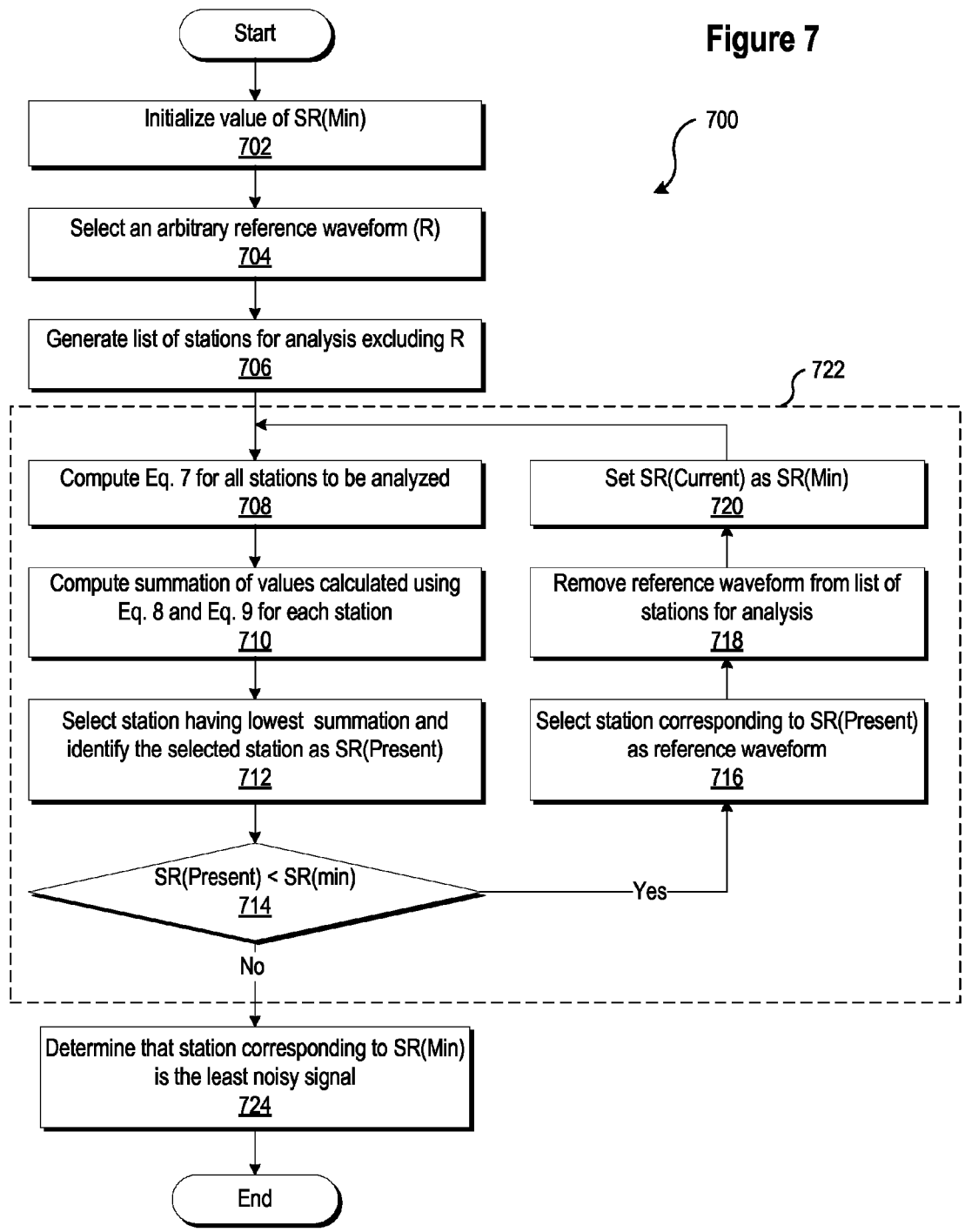

ELECTRIC POWER SYSTEM WAVEFORM SEARCH

RELATED APPLICATIONS

This application claims priority under 35 U.S.C. §119(e) to U.S. Provisional Patent Application No. 61/662,854, filed Jun. 21, 2012, and titled "Electric Power Waveform Search," which is incorporated herein by reference in its entirety.

TECHNICAL FIELD

This disclosure relates to searching electric power system waveforms. More particularly, this disclosure relates to improving search performance through indexing electric power system waveforms using waveform attributes such as frequency, amplitude, angle, rate of change, and the like. This disclosure also relates to detecting and indexing islanding conditions in an electric power system.

BRIEF DESCRIPTION OF THE DRAWINGS

Non-limiting and non-exhaustive embodiments of the disclosure are described, including various embodiments of the disclosure with reference to the figures, in which:

FIG. 5 illustrates one embodiment of a method for creating an index for searching data associated with an electric power distribution system in order to determine the angle between phasors of two different power system stations consistent with embodiments disclosed herein.

FIG. 7 illustrates one embodiment of a method that may be used to select a reference signal consistent with embodiments disclosed herein.

DETAILED DESCRIPTION

Figure 1:
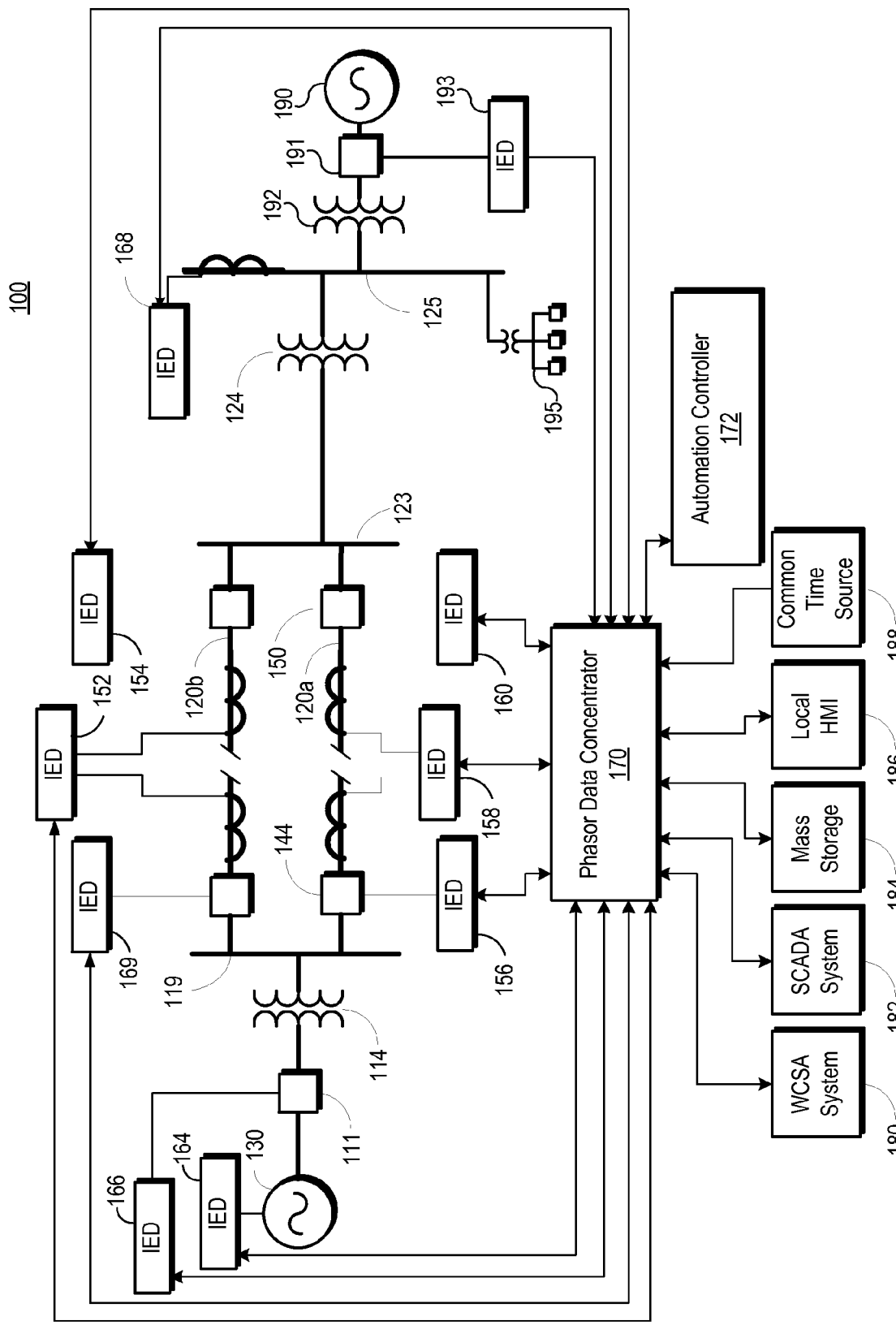
FIG. 1 illustrates a simplified one-line diagram of an electric power delivery system and associated Intelligent Electronic Devices (IEDs) consistent with embodiments disclosed herein.

With increasingly common use of automated monitoring, synchrophasors, and mass storage, the quantity of power system data being generated and stored has increased dramatically. Archiving power system data (synchrophasor or otherwise) can result in multiple terabytes (or more) of data archived per year. With a large amount of archived synchrophasor data, a natural desire is to search the data to find waveform features of interest. In some cases, this could be as simple as searching for any time that the frequency of a given station exceeded a threshold. In other cases, the search could have multiple criteria based, for example on the waveform value, rate of change, time over threshold, mathematical combination with another waveform, or many other possible search criteria. Searching waveform data associated with an electric power distribution system may improve understanding of the quality and reliability of the power system. The results from a search can be analyzed and used to improve the system. Searching such data by simply examining each stored value or values may require hours, days, or more to find events matching a given criteria. A large delay in finding results may significantly reduce the value of searching.

Historical data gathered from an electrical power distribution system may be used to understand an electric power generation and distribution system. Further, such data may be used to diagnose problems with the power system. Finding data of interest, however, may be a slow process. Identifying data of interest associated with an electric power distribution system may be particularly challenging because the information of interest may be stored in terms of waveform characteristics.

Indexing data in order to make searches less time consuming can provide numerous advantages. An index is a collection of data that is derived from the full data set. It can be thought of as a summary of the data targeted having a particular characteristic. The index in a textbook is an example. Instead of manually reading through every sentence in a book to find a target word, the reader consults the index, which indicates which page the word is on. Electronic information may also be indexed in order to facilitate searching. For example, Google uses an index to provide search results over all data on the internet in sub-seconds. These indexes are based on text-based search criteria. Accordingly, similar index solutions cannot be used to search the streams of numerical quantities associated with an electric power distribution system.

Disclosed herein are a variety of systems and methods for indexing power system waveforms in order to improve the likelihood of finding information of interest and to improve the timeliness of finding such information. According to some embodiments, search algorithms according to the present disclosure may create indexes of waveform characteristics (e.g., waveform frequency, amplitude, rate of change, maximum/minimum values, etc.). The present disclosure provides a high-speed optimization method to search power system waveform data and to return matches against waveform characteristics of interest.

According to some embodiments, multiple indexes may be used in combination to find information of interest. For example, for a given body of data, a separate index may be created for each of a variety of search parameters (e.g., waveform frequency, amplitude, rate of change, maximum/minimum values, etc.). Such embodiments may allow a user to specify multiple criteria relating to different types of search parameters. For example, such embodiments may facilitate the searching of data for a specified frequency and a specified rate of change. A single index, comprising a plurality of index values may be utilized in order to facilitate searching using multiple types of parameters. According to some embodiments, multiple indexes may be used that include a plurality of overlapping temporal index segments. Indexes having longer periods of time associated with each index entry may be used to focus searching in indexes having shorter periods of time associated with each index entry.

According to various embodiments, searches for power system information may be based on many different parameters based on features of a waveform associated with an electric power distribution system. For example, search parameters may seek to identify a waveform that contains features greater than or less than a given threshold, a waveform that contains features that meet a given criteria for at least a given time threshold, and/or a waveform that changes in a manner such that the absolute value of its first derivative (i.e., rate of change) is outside the range of certain thresholds. According to various embodiments, a search may be executed over isolated waveforms or combinations of waveforms. For example, a search may be executed relating to (1) a single waveform in the data set; (2) the difference between the angle of any two phasor waveforms in the data set; and/or (3) a mathematical computation of the data (referencing one or more waveforms in the data set); etc.

Electric power delivery systems may include electric power generation, transmission, distribution, and consumption. Such systems include various types of equipment such as generators, transformers, circuit breakers, switches, distribution lines, transmission lines, buses, capacitor banks, reactors, loads, and the like. A purpose of electric power delivery systems is to generate and deliver usable electric power to an end user or load. Often, the generation cites are located at great distances from an end user or load. Electric power from generation is typically at a relatively low voltage, but is transformed into a relatively high voltage before entering the transmission system. The voltage is again reduced for the distribution system, and often reduced yet again before ultimate delivery to the end user or load. The electric power may be monitored and controlled at various stages in the delivery system. Intelligent Electronic Devices (IEDs) are often used to collect electric power system information, make control and/or protection decisions, take control, automation, and/or protection actions, and monitor the electric power delivery system. IEDs may also be capable of calculating phasor information and using such in their respective algorithms. Phasor Measurement Units (PMUs) may include any IED capable of calculating phasors from electric power delivery system information. PMUs may be capable of calculating synchrophasors from the electric power delivery system information and even communicating phasor and/or synchrophasor information to a central unit such as a phasor data concentrator. The stored phasor and/or synchrophasor information may be useful for electric power delivery system control, automation, protection, and monitoring. The following disclosure describes indexing of the stored phasor and/or synchrophasor information.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described include software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable and/or computer-readable medium having stored thereon instructions that may be used to program a computer (or other electronic device) to perform processes described herein. The medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

FIG. 1 illustrates a simplified example of an electric power delivery system 100. The system 100 includes generator 130 which may be monitored by an IED such as a generator protection IED 164, and may generate electric power. Generator 130 may be connected to bus 119 via a circuit breaker 111, which may be controlled using IED 166, and via transformer 114 which may be a step-up transformer for transforming the voltage of the electric power from generator 130 to a higher voltage suitable for an electric power transmission system. Bus 119 and bus 123 may be connected via transmission lines 120a and 120b operating at transmission-level voltages. Transmission line 120*b* may include circuit breakers monitored and controlled by IEDs 169 and 154. Transmission line 120*a* may include circuit breakers monitored and controlled by IEDs 156 and 160. Transmission line 120*b* may be monitored by an IED 152 which may be capable of providing differential protection. Similarly, transmission line 120*a* may be monitored and controlled by IED 158 which may be capable of providing differential protection. Alternatively, transmission lines 120*a* and 120*b* may be monitored and/or controlled using multiple IEDs such as one IED at each end of the transmission lines capable of performing differential protection using communication therebetween. Bus 123 may be connected to a distribution bus 125 using a step-down transformer 124 that may be capable of stepping down the voltage from the transmission bus 123 to distribution levels. Bus 125 may be monitored and/or controlled using IED 168, and may provide electric power to load 195 (where the voltage may be stepped further down using a transformer). A further transformer 192 and circuit breaker 191 may connect transmission bus 125 to generator 190. Circuit breaker 191 may be monitored and controlled via IED 193. Generator 190 may be a distributed generator such as a solar-power generator, wind turbine, natural gas electric generator, diesel generator, or the like.

Although not separately illustrated, the various IEDs may obtain electric power information from the monitored equipment in system 100 using potential transformers (PTs, for voltage measurements), current transformers (CTs, for current measurements), and the like. The PTs and CTs may include any device capable of providing outputs that can be used by the IEDs to make potential and current measurements, and may include traditional PTs and CTs, optical PTs and CTs, Rogowski coils, hall-effect sensors, and the like. Furthermore, although not separately illustrated, each IED may include access to a common time source. The common time source may be distributed via a communications network (using, for example, IEEE-1588 protocol, NTP protocol, or the like), or obtained locally at each IED. The common time source may be a universal time, such as that delivered using global positioning system (GPS) satellites, WWVB, WWV, or the like. A common time may be used to time-synchronize measurements of the electric power system, and in the calculation of synchrophasors. Measurements may be paired with a time stamp or time tag indicating a time at which the measurement was made. Accordingly, phasors calculated by the IEDs may include a time stamp indicating a time at which the measurement was made.

IEDs in system 100 may be configured to communicate phasor and/or synchrophasor information to a central unit such as Phasor Data Concentrator (PDC) 170. The PDC 170 may be capable of receiving and storing the phasor and/or synchrophasor or other gathered or calculated power system information (hereinafter "PMU data"). The PDC 170 may be in communication with a mass storage device 184 capable of storing the PMU data received by PDC 170.

PDC 170 may also be in communication with a number of other devices or systems that may consume PMU data. Such devices or systems may include, for example, a Wide Area Control and Situational Awareness (WCSA) System 180, Supervisory Control and Data Acquisition (SCADA) System 182, local Human-Machine Interface (HMI) 186, or automation controller 172. PDC 170 may further include a time input, which may receive a time signal from a common time source 188.

Figure 2:
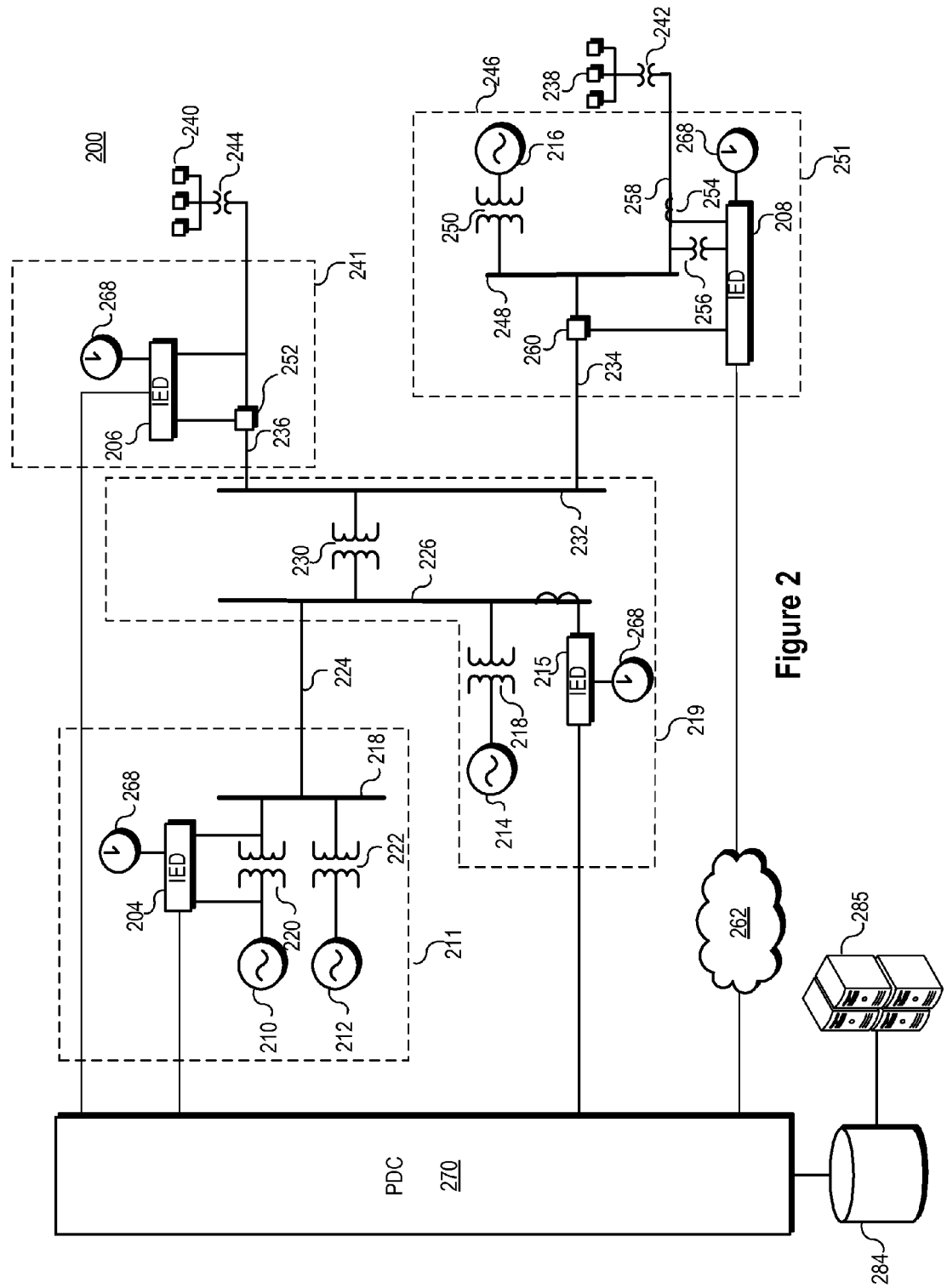
FIG. 2 illustrates another simplified one-line diagram of an electric power delivery system and associated IEDs with various substations consistent with embodiments disclosed herein.

FIG. 2 illustrates another example of an embodiment of a simplified one-line diagram of an electric power delivery system 200 with various substations. A PDC 270 may be in communication with various IEDs 204, 206, 208, and 215. IEDs 204, 206, 208 and 215 may be remote from PDC 270, may communicate over various media such as a direct communication from IED 206 or over a wide-area communications network 262.

The electric power delivery system 200 illustrated in FIG. 2 may include a generation substation 211. Substation 211 may include various generators 210 and 212 connected to a bus 218 through step-up transformers 220 and 222. Bus 218 may be connected to bus 226 in substation 219 via transmission line 224. Although the equipment in substation 211 may be monitored and/or controlled by various IEDs, only a single IED 204 is shown. IED 204 may be a transformer protection IED for transformer 220, and may also be a PMU. IED 204 may receive a common time signal 268 which, as indicated above, may be distributed in system 200 using a communications network or using a universal time source, such as GPS, or the like. Utilizing a common or universal time source may ensure that IEDs have a synchronized time signal that can be used to generate time synchronized data, such as synchrophasors.

Substation 219 may include a generator 214, which may be a distributed generator, and which may be connected to bus 226 through step-up transformer 218. Bus 226 may be connected to a distribution bus 232 via a step-down transformer 230. Various distribution lines 236 and 234 may be connected to distribution bus 232. Distribution line 236 may lead to substation 241 where the line is monitored and/or controlled using IED 206, which may selectively open and close breaker 252. Load 240 may be fed from distribution line 236. Further step-down transformer 244 may be used to step down a voltage for consumption by load 240.

Distribution line 234 may also lead to substation 251, and deliver electric power to bus 248. Bus 248 may also receive electric power from distributed generator 216 via transformer 250. Distribution line 258 may deliver electric power from bus 248 to load 238, and may include further step-down transformer 242. Circuit breaker 260 may be used to selectively connect bus 248 to distribution line 234. IED 208 may be used to monitor and/or control circuit breaker 260 as well as distribution line 258.

Mass storage device 284 may store PMU data from one or more PDCs (e.g., PDC 270). Data in mass storage device 284 may be made available to various devices such as search device 285. Search device 285 may include the appropriate hardware and software for obtaining data from mass storage device 284, searching the data, indexing the data, storing an index of the data, displaying results of a search, and the like. Search device 285 may be remotely accessed or locally accessed. Search device 285 may include HMI software allowing a user to design search criteria and observe/save search results. The waveform searching and indexing described herein may be performed by search device 285.

Figure 3:
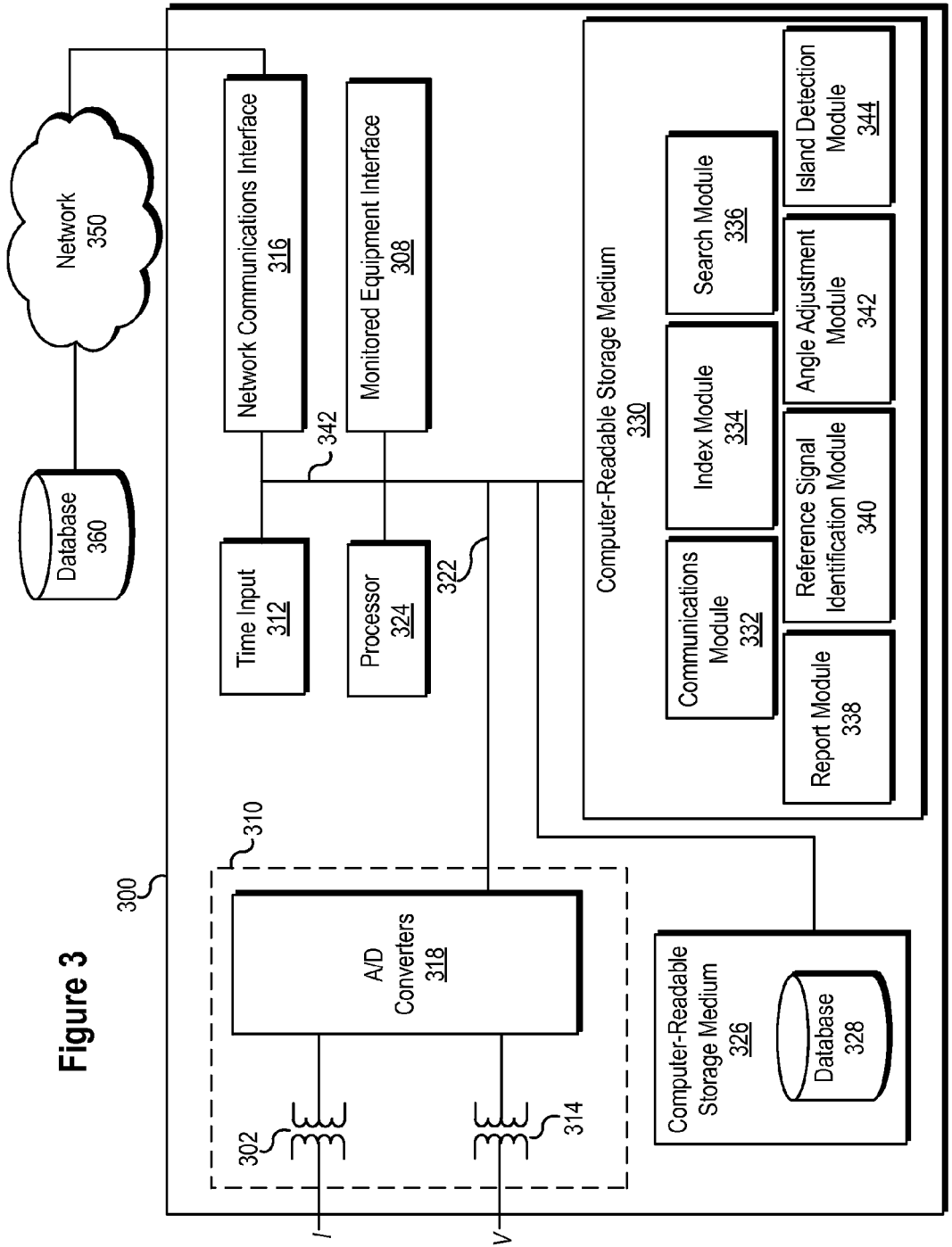
FIG. 3 illustrates a functional block diagram of an IED that may be used for creating an index or for performing a search using an index consistent with embodiments disclosed herein.

FIG. 3 illustrates a functional block diagram of an IED 300 that may be used for creating an index or for performing a search using an index. IED 300 includes a network communications interface 316 configured to communicate with a network 350, which may be in communication with other IEDs and/or system devices. In certain embodiments, the network communications interface 316 may facilitate direct communication with another IED or communicate with another IED via network 350. IED 300 may further include a time input 312, which may be used to receive a time signal (e.g., a common or universal time reference) allowing IED 300 to include a time-stamp on communications therefrom and/or synchronize sampling with other IEDs. In certain embodiments, a common time reference may be received via network communications interface 316, and accordingly, a separate time input may not be required for time-stamping and/or synchronization operations. One such embodiment may employ the IEEE 1588 protocol. A monitored equipment interface 308 may be configured to receive status information from, and issue control instructions to, a piece of monitored equipment (such as a circuit breaker, conductor, transformer, or the like).

According to various embodiments, IED 300 may be in communication with a database 360 via network communications interface 316. Database 360 may comprise a plurality of waveforms associated with an electric power distribution system. IED 300 may be configured to access database 360 in order to include information from database 360 in an index generated by IED 300.

Processor 324 may be configured to process communications received via network communications interface 316, time input 312, and/or monitored equipment interface 308. Processor 324 may operate using any number of processing rates and architectures. Processor 324 may be configured to perform various algorithms and calculations described herein. Processor 324 may be embodied as a general purpose integrated circuit, an application specific integrated circuit, a field-programmable gate array, and/or any other suitable programmable logic device.

In certain embodiments, IED 300 may include a sensor component 310 configured to gather information relating to waveforms associated with an electric power distribution system. In the illustrated embodiment, sensor component 310 is configured to gather data directly from a conductor (not shown) and may use, for example, transformers 302 and 314 and A/D converters 318 that may sample and/or digitize filtered waveforms to form corresponding digitized current and voltage signals provided to bus 322. ND converters 318 may include a single A/D converter or separate ND converters for each incoming signal. A current signal may include separate current signals from each phase of a three-phase electric power system. ND converters 318 may be connected to processor 324 by way of bus 322, through which digitized representations of current and voltage signals may be transmitted to processor 324. In various embodiments, the digitized current and voltage signals received via sensor component 310 and may be stored and indexed according to one or more parameters.

According to some embodiments disclosed herein, indexes may be computer generated and computer consumed. Indeed, the user of a search program may not know that the index exists. In other words, use of an index in order to search for waveforms of interest may be transparent to an end user. Indexes according to the present disclosure incorporate numerical values relating to various criteria of a waveform associated with an electric power distribution system. Multiple indexes can be used, each of which may index a certain parameter of a waveform. The indexes may be created any time after the data is received, but before a search is requested. According to certain embodiments, the data may be indexed in real time. According to another embodiment, the data may be indexed according to a schedule, such that data for a particular period of time is accumulated and indexed together. Once the index is created, it need not be changed unless the source data is changed.

A non-transitory computer-readable storage medium 326 may be the repository of a database 328 of waveform data associated with an electric power distribution system. According to some embodiments, database 328 may store synchrophasor data. Although illustrated in FIG. 3 as an integral part of IED 300, database 328 may be physically separated and/or remote from IED 300 in certain other embodiments. For example, database 328 may comprise a network accessible storage device accessible to IED 300 via network communications interface 316.

Computer-readable storage medium 330 may be the repository of various software modules configured to perform any of the methods described herein. A data bus 342 may link monitored equipment interface 308, time input 312, network communications interface 316, and computer-readable storage mediums 326 and 330 to processor 324. According to some embodiments, computer-readable storage mediums 326 and 330 may be the same medium (i.e., the same disk, the same non-volatile memory device, or the like) or separate mediums, as illustrated in FIG. 3.

Communications module 332 may be configured to allow IED 300 to communicate with any of a variety of external devices via network communications interface 316. Communications module 332 may be configured for communication using a variety of data communication protocols (e.g., TCP/IP, IEC 61850, etc.). Communications module 332 may, according to certain embodiments, facilitate the publication of information associated with the index, in order to allow users remote from IED 300 to search for information stored in database 328 and/or database 360.

Index module 334 may be configured to generate an index based upon waveform data associated with an electric power distribution system. Indexing module 334 may be configured to create one or more indexes associated with one or more parameters of the waveform data. Index module 334 may be operable in conjunction with processor 324 in order to index such data. According to some embodiments, indexing may be performed temporally. In other words, waveform data to be indexed may be divided into a plurality of time periods. When an index parameter satisfies a search criterion, the result may comprise the data associated with the corresponding period of time in the index.

Index module 334 may be configured to generate one or more indexes utilizing a variety of algorithms and based on a variety of parameters. According to certain embodiments, an index may comprise a maximum/minimum value associated with a specific time period. According to other embodiments, a particular block of time (e.g., 10 minutes) may be analyzed in order to determine minimum and maximum values for each of a variety of parameters (e.g., frequency, amplitude, rate of change, etc.). The maximum and minimum values associated with each parameter may be stored in an index. In response to a user query, it may be determined whether the query value is satisfied by the value associated with an index entry. If so, the time period associated with the relevant index entry may be retrieved. Embodiments having longer periods of time associated with each index entry may be more likely to perform additional searching within a time identified as relevant after consulting an index. In contrast, embodiments having a high level of granularity (e.g., a short time period associated with each index entry) may be less likely to require additional searching after a relevant period of time is identified.

According to one embodiment, index module 334 may be configured to generate an index based upon the rate of change of a parameter (e.g., rate of change of frequency, rate of change of amplitude). In generating an index based on a rate of change, indexed module 334 may analyze a signal x(t). Index module 334 may select a period of time over which to compute the first derivate of the signal. For each period T, index module 334 may find the maximum value for the range of the signal from x(t) to x(t+T), for each of n time periods. The determined maximum rate of change may be stored in the index, together with a timestamp corresponding to the period.

According to certain embodiments, the index may store the absolute value of the maximum and/or minimum value.

An index created by index module 334 may be stored on computer-readable storage medium 326 or 330. Further, an index may be stored in database 328 or 360. Further, an index may be stored in a variety of formats, according to various embodiments. For example, certain embodiments may store a plurality of indexes having differing, and even overlapping levels of granularity. FIG. 4B, for example illustrates one embodiment of a method that may be used to search an index having varying periods of time per index entry. Index module 334 may be configured to generate such an index.

Index module 334 may update an index continually, according to a schedule, or on an as needed basis, according to various embodiments. According to some embodiments, as waveform data is received or updated, index module 334 may process such data and make appropriate changes in the index. According to other embodiments, generating or updating an index may be completed on a schedule.

Search module 336 may be configured to receive search parameters from the user, interact with the index in order to identify data matching the search parameters, and retrieve data matching the search parameters. As discussed above, data matching the search parameters may comprise determining a particular block of time associated with indexed parameters meeting the search criteria specified by the user. According to some embodiments, additional searching may be conducted within the particular block of time associated with the data matching the search parameters.

According to certain embodiments for searching a rate of change index, the search criteria may include a time period ($dt_c$) for computing the derivative, as well as the threshold of the derivative ($dx_c$). Because the index only includes discrete values for dt, the input search criteria $dt_c$ may not match one of the discrete values in the index. To resolve this issue, before running the search algorithm, search module 336 may adjust the $dt_c$ to the largest of the index values that is smaller than the search criteria $dt_c$. This adjusted value may be referred to as $dt_a$. Further, an adjusted $dx_c$, which may be referred to as $dx_a$, may be calculated according to Eq. 1.

$$dx_a = dx_c * \frac{dt_a}{dt_c} \quad \text{Eq. 1}$$

After computing $dx_a$, search module 336 may utilize a suitable search algorithm, such as the algorithms described below in connection with FIG. 4A and FIG. 4B.

Report module 338 may be configured to generate a variety of reports relating to, among other things, the status of an index and the types of data parameters searchable using the index. Report module 338 may be configured to monitor and provide an indication of the status of an index. Information relating to status may include whether the index is currently available for searching, the date and time range of data included in the index, minimum/maximum values found in the index, the number of items found in the index, the size of the index, etc. Report module 338 may further be configured to identify the types of data parameters searchable using the index. For example, an index of power delivery information may comprise data relating to a variety of parameters (e.g., frequency, amplitude, rate of change, deviation from an expected value, time over a specified threshold, mathematical combination with another waveform, minimum/maximum values, etc.).

According to certain embodiments, report module 338 may further be configured to output the result of a search in a format specified by the user. Report module 338 may be configured to export data associated with the data matching the search parameters specified by the user. For example, some embodiments may be configured to export data using common file formats (e.g., XML, CSV, COMTRADE, etc.).

Reference signal identification module 340 may be configured to determine which of a plurality of stations exhibits the best characteristics for use as a reference station. As described in greater detail below, the reference signal may be used in the creation of an index of electric power distribution system information. Indexed signals may be compared to the reference signal in order to facilitate indexing and searching waveform data. Specific embodiments of methods that may be implemented by reference signal identification module 340 are described below with reference to Equations 8 and 9, and FIG. 7.

Angle adjustment module 342 may be configured to selectively adjust data associated with phasor angle data to incorporate such data into an index and allow for searching algorithms to correctly identify data of interest in response to a user query. Specific embodiments of various methods relating to adjustments of angles in electric power distribution system information are described with reference to FIG. 8A.

Island detection module 344 may be configured to group the plurality of stations into one or more electrical islands. As described in greater detail below, island detection module 344 may implement a variety of strategies in order to determine whether a particular station is electrically connected to other stations. Specific embodiments of methods that may be implemented by island detection module 344 are described with reference to FIG. 6A and FIG. 6B.

An electrical island may be created when a distributed generation site is disconnected from the utility (e.g., a fault on a transmission line, or the like). In such a case, the distributed generation site delivers electric power to the load in the island. An islanding condition may lead to safety risks to utility personnel and potential power quality issues with the loads that are connected to the distributed generation site. Further, safety issues and damage to equipment may be caused by out-of-phase closing of circuit breakers. Finally, comparing data from electrically isolated stations may result in an incorrect analysis of the data. For example, large phase angles between electrically connected stations can mean high stress conditions on the electric power distribution system. If a large phase angle is detected between two electrically isolated stations, it may be incorrectly inferred that the large phase angle is caused by a high stress condition. This incorrect inference may be avoided by a system that recognizes that the stations having the large phase angle between them are electrically isolated.

Figure 4A:
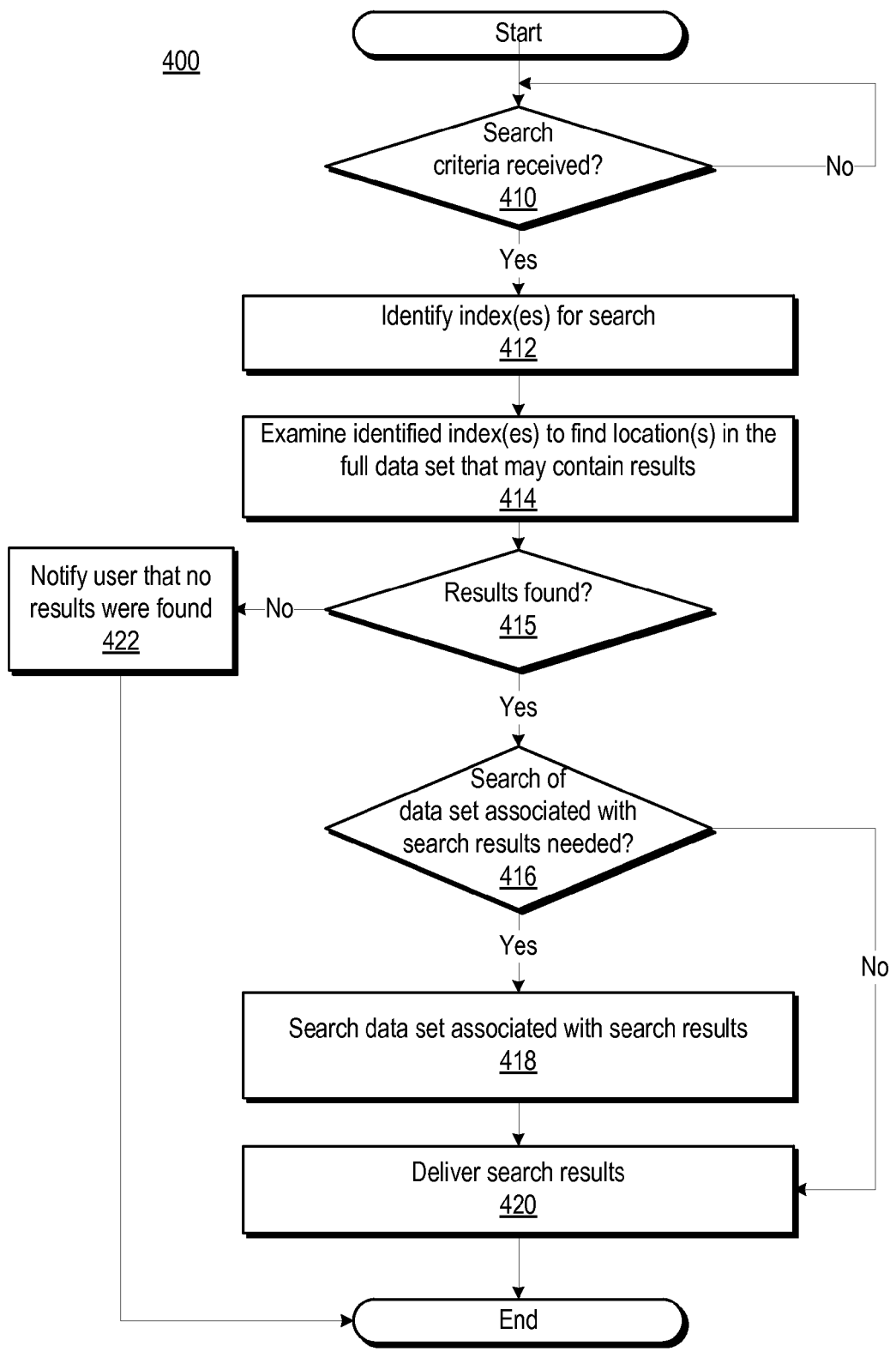
FIG. 4A illustrates a flowchart of a method for searching a database containing waveform data gathered from an electric power distribution system using one or more indexes consistent with embodiments disclosed herein.
Figure 4B:
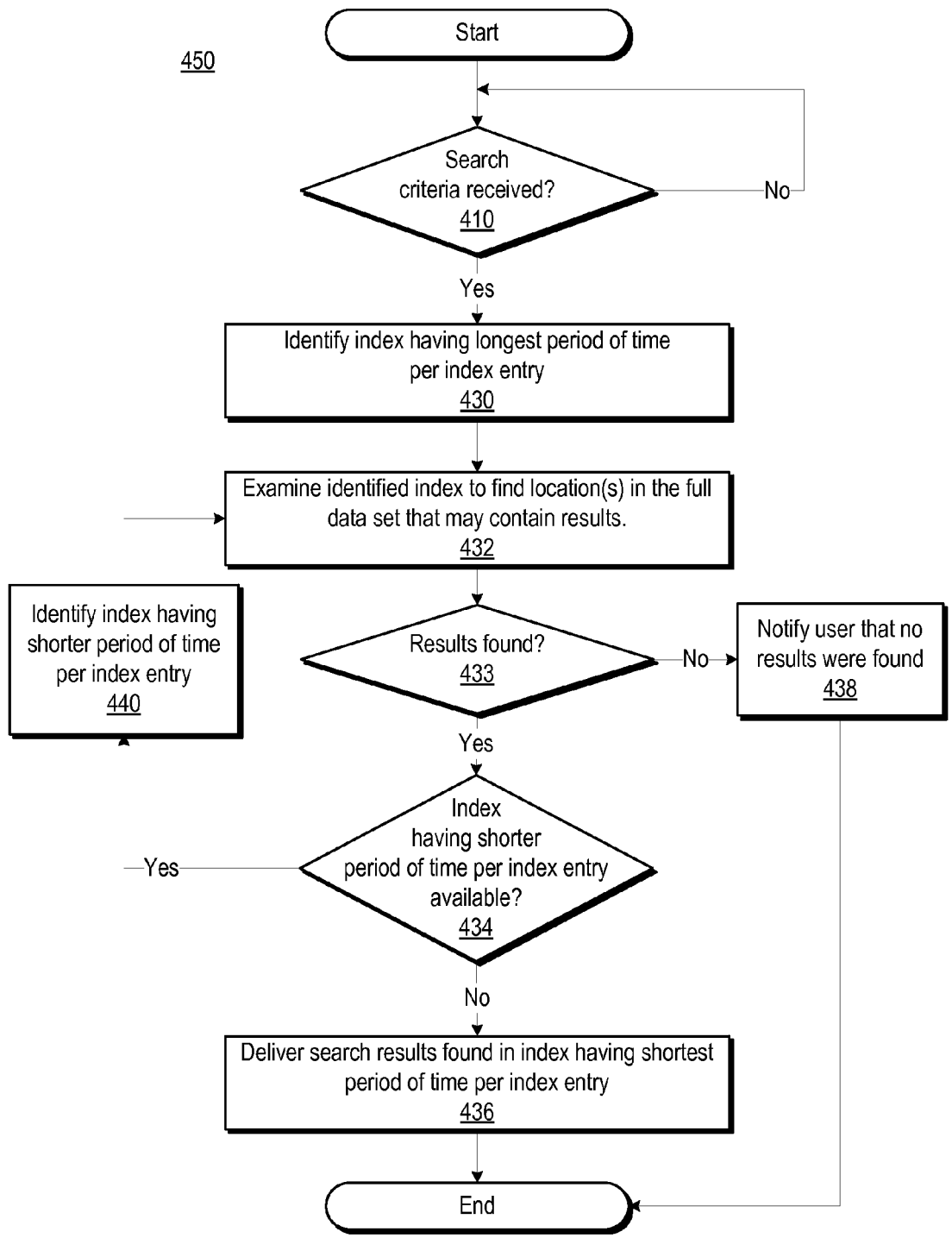
FIG. 4B illustrates a flowchart of a method for searching a database containing waveform data gathered from an electric power distribution system using multiple indexes having a plurality of overlapping temporal segments consistent with embodiments disclosed herein.

FIG. 4A illustrates a flowchart of a method 400 for searching a database containing waveform data gathered from an electric power distribution system using one or more indexes, according to embodiments consistent with the present disclosure. At 410, method 400 may determine whether search criteria have been received from a user. When criteria are received, one or more indexes to be searched are identified at 412. The analysis of which of the one or more indexes search may be based on the type of search parameters received from the user. For example, if a user enters a search parameter seeking a specific rate of change associated with a waveform, an index including rate of change information may be searched, while another index may be omitted from the search. At 414, the one or more identified indexes may be examined to find one or more locations in the full data set that may contain results. Method 400 may determine at 415 whether results were found. If no results were found, at 422, the user may be notified that no results were found.

If results were found to the user's query, method 400 may determine at 416 whether a search of the data set associated with the search results is to be performed. Various embodiments may accommodate a wide range in the level of granularity associated with an index. For example, one embodiment may create an index entry associated with period of time as small as 1 second or less. In another example, one embodiment may have much longer periods of time associated with each index entry, such as 1 day or more. Where an index includes only relatively long time periods (e.g., 10 minutes per index entry), method 400, may search the data set associated with the search results in order to identify with greater particularity the data responsive to the search criteria. A search of the data set associated with the search results may be performed at 418. At 420, the search results may be delivered to the user.

Some embodiments according to the present disclosure may be configured to create an index having variable blocks of time associated with each index entry. According to such embodiments, during periods in which monitored parameters remain relatively stable, data may be indexed with a low level of granularity (i.e., a long period of time be associated with each index entry). In contrast, during periods of time in which monitored parameters are less stable, data may be indexed with a high level of granularity. For example, in an index relating to frequency, where frequency variations fall below a threshold (e.g., 10 micro hertz), the time period associated with the index entry may be relatively long. In contrast, where frequency variations exceed the threshold, a finer level of granularity may be applied in creating and associated index for the period of time in which the variations exceed the threshold.

Certain embodiments consistent with the present disclosure may incorporate synchrophasor data. Power system Synchrophasor data consists of vectors of samples representing the magnitude and angle of a particular quantity at the given time. The angle may be represented as $\theta_x$, where the x indicates the station at which that the angle was measured. When performing calculations for indexing angle values according to various embodiments, it may be assumed under certain conditions that the values are all from the same point in time. When such conditions are met, the time of the measurement may be ignored. Assuming such conditions are met, an array of angles is identified by $\overline{\theta_x}$, with each individual angle in the vector identified as $\theta_{x_i}$, where i is the index of the angle value within the array. A difference between the angle values at two stations x and y at a given point in time may be identified by $\theta_{xy}$, and may be calculated by simply subtracting the angles at each station.

The following properties of array minimums and maximums may be used in connection with method 400.

$$\min(\overline{\theta_{xz}}) \geq \min(\overline{\theta_{xy}}) + \min(\overline{\theta_{yz}}) \qquad \text{Eq. 2}$$

$$\max(\overline{\theta_{xz}}) \leq \max(\overline{\theta_{xy}}) + \max(\overline{\theta_{yz}}) \qquad \text{Eq. 3}$$

$$\max(\overline{\theta_{xy}}) = -\min(\overline{\theta_{xy}}) \qquad \text{Eq. 4}$$

According to one embodiment, the angle search problem can be stated as follows: given three tags s, t, and r; and four index values $\max(\overline{\theta_{sr}})$, $\min(\overline{\theta_{sr}})$, $\max(\overline{\theta_{tr}})$, $\min(\overline{\theta_{tr}})$ for a given period; determine if that period might contain an angle $\theta_{st}$ that is greater than the maximum search criteria or less than the minimum search criteria. A lower bound may be computed on $\min(\overline{\theta_{st}})$ using Eq. 5, and an upper bound may be computed on $\max(\overline{\theta_{st}})$ using Eq. 6.

$$\min(\overline{\theta_{st}}) \geq \min(\overline{\theta_{sr}}) - \max(\overline{\theta_{tr}}) \qquad \text{Eq. 5}$$

$$\max(\overline{\theta_{st}}) \leq \max(\overline{\theta_{sr}}) - \min(\overline{\theta_{tr}}) \qquad \text{Eq. 6}$$

The values of $\min(\overline{\theta_{st}})$ and $\max(\overline{\theta_{st}})$ may be used by the search algorithm to determine if the particular period of time associated with an index entry should be examined. According to some embodiments, the final determination of a search match may be made only after looking at actual angle differences, since the index will only provide upper and lower bounds. By storing 0 as the maximum and minimum index values for a reference signal, which is described in greater detail below, the above equations will function correctly for any two arbitrary stations, even if one of the stations is the reference station.

FIG. 4B illustrates a flowchart of a method 450 for searching a database containing waveform data gathered from an electric power distribution system using multiple indexes having a plurality of overlapping temporal segments. The periods of time associated with each index may be increasingly fine (e.g. 1 hour, 1 minute, and 1 second). Further, according to the present embodiment, each index has the same ratio between each time period (i.e., a factor of 60). According to other embodiments, different ratios may be utilized between each time period. Although described as multiple indexes, according to some embodiments multiple indexes may be provided within the same electronic file using a hierarchical approach.

At 410, method 450 may determine whether search criteria have been received from a user. A search may begin at 430 with an index having the longest period of time associated with each index entry. According to the present embodiment, the index may correspond to having the largest time period associated with each index entry may be one hour. At 432, the identified index may be examined to find one or more locations in the full data set that may contain results. It may be determined, at 433, whether results were found. If not, method 450 may notify a user that no results were found at 438. If results were found, it may be determined, at 434, whether an index having a shorter period of time per index entry is available. For example, if the previously examined index had a period of time of one minute per index entry, and an index is available having a period of time of one second per index entry, method 440 identifies the index with one second per index entry at 440 and returns to 432.

After examining the indexes and determining that there is not an index having a shorter period of time per index entry, at 436, method 450 may deliver the search results found in the index having the shortest period of time per index entry. According to some embodiments, further searching may be performed, if desired, in order to more specifically identify data of interest within the search results.

FIG. 5 illustrates methods relating to indexing and searching data associated with an electric power distribution system in order to determine the angle between phasors of two different power system stations. As stated above, large angles may signal high stress conditions on the electric power distribution system, and thus operators of the electric power distribution system may utilize such data for analysis of power system integrity. To optimize searches that have a criteria of an angle difference between two phasor signals being greater than or less than a given threshold, it may also be useful to identify stations that are on the same electrical island.

According to one embodiment, the method illustrated in FIG. 5 may allow a user to implement searches using one or more of the following criteria:
1. Search any phasor angle in the index with respect to another arbitrary angle;
2. Search any phasor angle in the index using minimum or maximum values;
3. Search any phasor angle in the index a phasor angle using rate of change values;
4. Search for non-connected electrical grids (i.e., islands). According to one embodiment, searches crossing different electrical islands may result in invalid results (for the period in which the grids are unconnected). Further, it may be assumed for purposes of the methods illustrated in FIG. 5 that within a given time period, the range of values in an array of differences between two stations on the same island do not exceed 180°.

The method illustrated in FIG. 5 may overcome certain challenges associated with searching data associated with an electric power distribution system to determine the angle between phasors of two different power system stations. For example, where the global positioning system is used as a time reference, angles in the database may be continually rotating because the reference used at the PMU is the GPS time, which is not synchronized with the power system. Further, electric power distribution systems may gather synchrophasor data from a large number of phasor measurement units (PMUs). In some commercial electric power distribution systems there may be 100 or more PMUs. Accordingly, indexing all permutations may be impractical.

FIG. 5 illustrates one embodiment of a method 500 for creating an index for searching data associated with an electric power distribution system to determine the angle between phasors of two different power system stations. Method 500 may iterate any number of times to index each time period associated with a data set. At 502, a data signal to be analyzed may be divided into time segments or periods. As described above, the time periods may be fixed (e.g. 10 minutes), or the time periods may be variable (e.g. longer for periods of time in which monitored parameters remain relatively stable and shorter for periods of time in which monitored parameters are varying). At 504, a list of time periods to be analyzed may be generated. According to some embodiments, method 500 may be utilized to index a data stream in real time, or near to real time. According to such embodiments, elements 502 and 504 may be replaced by an element that periodically divides up the data stream into time periods. At 506, it may be determined whether a list of time periods to be analyzed is empty. If so, method 500 may terminate. If the list of time periods to be analyzed is not empty, method 500 may proceed to 508.

Method 500 may iterate any number of times in order to index each time period. The array of angle data being analyzed may be defined as $\overline{\theta}_s$. At 510, method 500 may determine the array of angle data being analyzed relative to a reference signal. The array of angle data being analyzed relative to the reference signal may be defined as $\overline{\theta}_{sr}$ and may be calculated for each angle value i in the vectors using Eq. 7.

$$\theta_{sr_i} = \theta_{s_i} - \theta_{r_i} \qquad \text{Eq. 7}$$

For purposes of calculations involving Eq. 7, it may be assumed any value that is outside the range −180° to 180° is mapped back into that range by adding 360° degrees to values less than −180° or subtracting 360° degrees from values greater than 180°.

Maximum and minimum values of the time period being analyzed may be determined at 512. The maximum and minimum values and a timestamp for the period being analyzed may be stored in the index at 514. At 516, the analyzed time period may be removed from the list of time periods to be analyzed, and method 500 may return to 506 to begin and assess another time period.

Figure 6A:
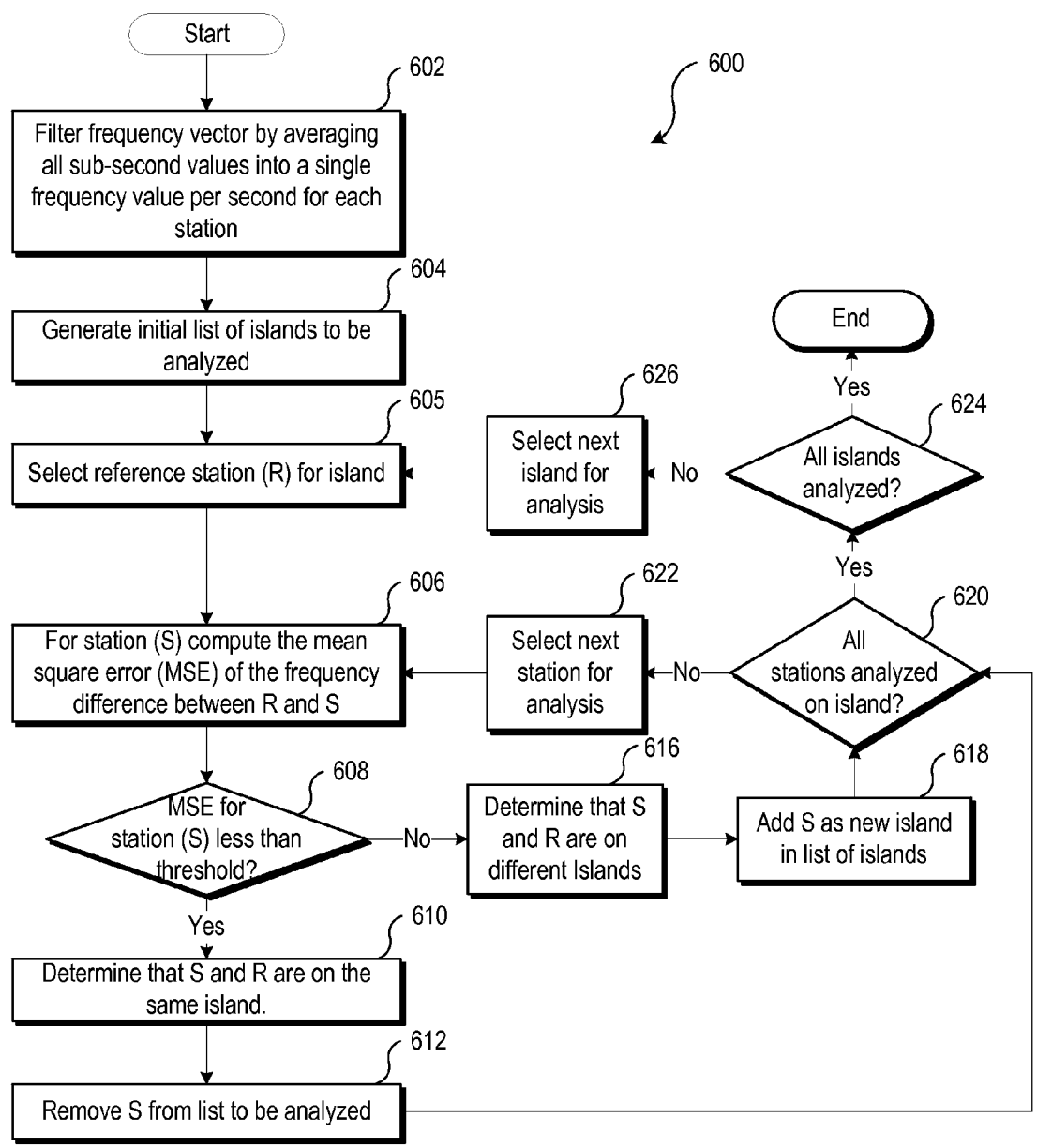
FIG. 6A illustrates one embodiment of a method for island detection within an electric power delivery system consistent with embodiments disclosed herein.

FIG. 6A illustrates one embodiment of a method 600 for island detection within an electric power delivery system. Island detection may be useful for a variety of reasons, including generation of one or more indexes that may be used in connection with searches of waveform data. At 602, a frequency array may be filtered by averaging all sub-second values into a single frequency value per second for each station. At 604, an initial list of islands to be analyzed may be generated. According to some embodiments, the initial list of islands may comprise only a single island. As method 600 progresses, different islands may be identified and added to the list of islands to be analyzed. According to other embodiments, it may be known at the outset that certain stations are electrically isolated from each other, and thus are located on separate electrical islands. Accordingly, these islands may be included in the initial list of islands to be analyzed at 604.

A reference station (R) may be selected for each island to be analyzed, at 605. According to some embodiments, an analysis may be performed in order to determine which station is to be selected as the reference station for a given island. Specifically, according to one embodiment, the station in an electric power distribution system that minimizes Eq. 8 may be selected as the reference station.

$$\Sigma \Delta_{sr} \qquad \text{Eq. 8}$$

In Eq. 8, the value of $\Delta_{sr}$, is determined by Eq. 9.

$$\Delta_{sr} = \max(\overline{\theta}_{sr}) - \min(\overline{\theta}_{sr}) \qquad \text{Eq. 9}$$

Utilizing Eq. 8 to select the reference station from among the plurality of stations may result in the selection of a reference signal having the least "noise" (e.g., in the phasor angle) relative to all other signals on a particular island. Although not required in all embodiments, using the least noisy station as the index reference may improve index performance. Another embodiment for selecting a reference station is illustrated in FIG. 7. According to still other embodiments, the reference signal may be arbitrarily selected. In other words, according to such embodiments no particular feature is analyzed or selected prior to designating a station as the reference station.

At 606, for a station being analyzed (S), the mean square error (MSE) of the frequency difference between the reference and the station is calculated according to Eq. 10. In Eq. 10, $\overline{f}_x$ is the array of filtered frequencies for the period, for station X (i.e., either the station being analyzed (S) or the reference station (R)).

$$\text{MSE}(\overline{f}_S, \overline{f}_R) = \text{ave}[(f_{S_i} - f_{R_i})^2] \qquad \text{Eq. 10}$$

A comparison of the MSE for the station being analyzed and the reference station may be made at 608 to determine whether the MSE is less than a threshold. According to one embodiment, the threshold may be a value on the order of 50 microHz. If the MSE between the station and the reference station is less than the threshold, at 610, it may be determined that the station and the reference are on the same island. The station being analyzed may be removed from a list of stations to be analyzed at 612.

At 620, it may be determined whether all stations have been analyzed on a particular island. If additional stations require analysis on the island, at 622, the next station for analysis may be selected, and method 600 may return to 606. If analysis of all stations on the island is complete, method 600 may move to a determination at 624 of whether all islands have been analyzed. If all islands have been analyzed, method 600 may end. If not, the next island for analysis may be selected, at 626, and method 600 may return to 605.

If it is determined, at 608, that the MSE for a station being analyzed exceeds the threshold, at 616, it may be determined that the station being analyzed and the reference station are on different islands. At 618, the station being analyzed may be added as a new island in the list of islands for analysis. Method 600 may iterate any number of times necessary in order to analyze each station and each island and to determine a complete list of stations associated with each island.

Figure 6B:
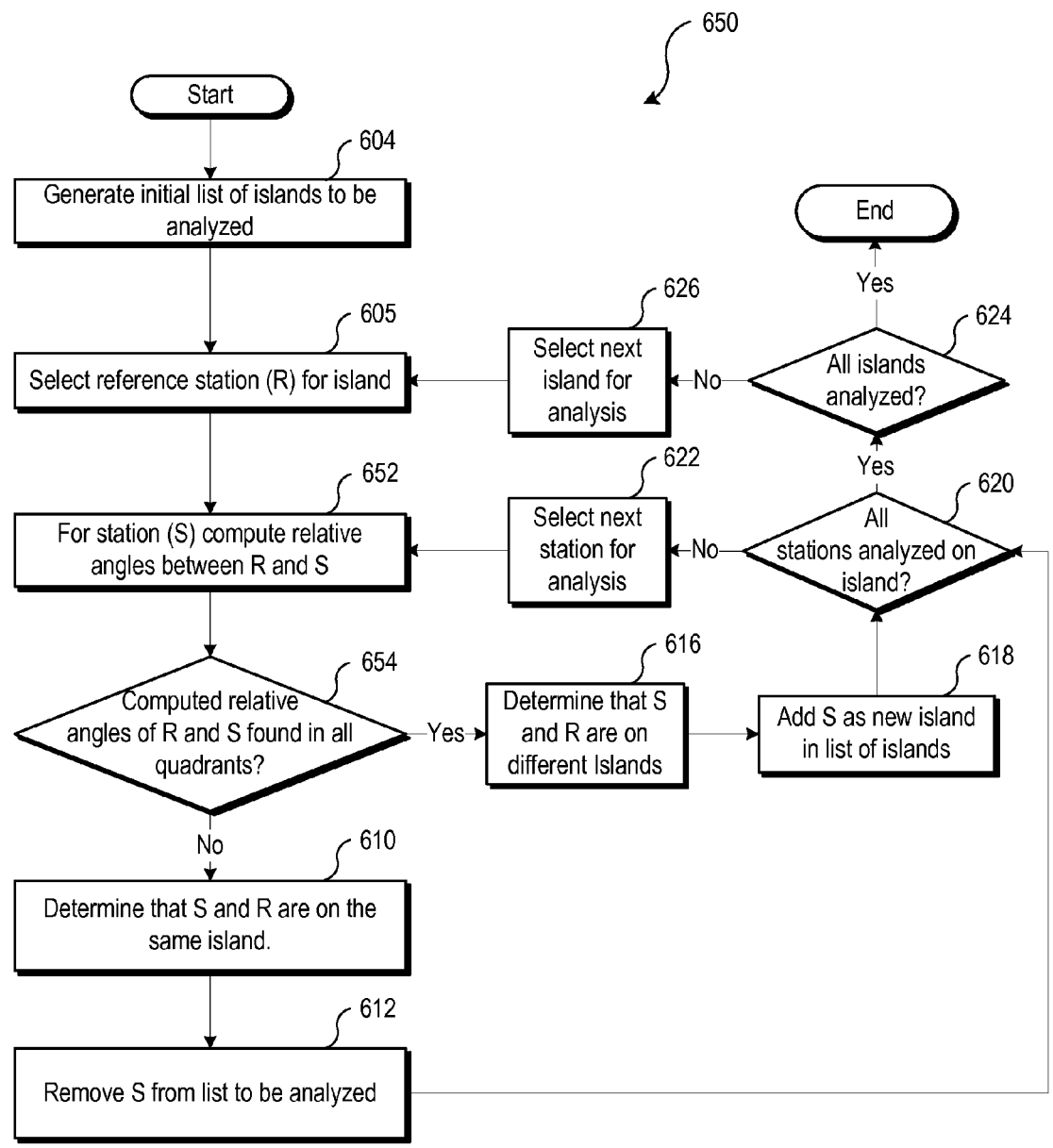
FIG. 6B illustrates a flow diagram of a method for island detection within an electric power distribution system consistent with embodiments disclosed herein.

FIG. 6B illustrates a flow diagram of a method 650 for island the detection within an electric power distribution system, according to various embodiments. Method 650 includes many of the same elements included in method 600 and illustrated in FIG. 6A. In FIG. 6A and FIG. 6B, similar elements are designated using the same reference number. Features described in connection with FIG. 6A that are also included in FIG. 6B are only described in connection with FIG. 6A.

Method 650 may rely on computed relative angles between a reference station (R) and other station being analyzed (S) on the same island. At 652, for a particular station (S), the relative angles between R and S may be computed. According to some embodiments, this computation may be made using Eq. 7. At 654, method 650 may determine whether the computed relative angles of all R and S are found in all quadrants. If so, it may be determined, at 616 that S and R are on different islands; if not, it may be determined at 610 that S and R are on the same island.

FIG. 7 illustrates one embodiment of a method 700 that may be used to select a reference signal from a plurality of waveforms, according to certain embodiments. As described above, Eq. 8 may be utilized by some embodiments in order to select which of a plurality of possible stations is used as the reference station for a particular electrical island; however, computing a solution to Eq. 8 may be computationally intensive. The iterative algorithm illustrated in FIG. 7 may require fewer computational resources.

Method 700 may seek to identify a value identified as SR(Min), which may be calculated using Eq. 8 and Eq. 9 in an iterative process. At 702, the value of SR(Min) may be initialized. The initial value may be selected to ensure that it is always greater than a value resulting from actual data. An arbitrary waveform (R) associated with the station located on an island in an electric power distribution system may be selected at 704. A list of stations, excluding R, may be generated at 706.

An iterative component of method 700 may perform an analysis to determine which of a plurality of stations is to be used as a reference station. At 708, the result of Eq. 9 may be calculated for each station to be analyzed with respect to the reference station. A summation of these results for each station may be computed at 710. After computing the summation of the results, at 712, the station having the lowest summation may be identified as SR(Present).

A comparison of the value of SR(Present) and SR(Min), at 714, may provide an indication of the station having the best characteristics for use as the reference signal. If SR(Present) is less than SR(Min), iterative process 722 continues. At 716, the station corresponding to SR(Present) may be selected as a reference waveform for the next iteration. The reference waveform may be removed from the list of stations for analysis at 718, and SR(Min) may be set equal to SR(Current). When method 700 determines at 714 that SR(Present) is greater than SR(Min), iterative process 722 stops. At 724, it may be determined that the station corresponding to SR(Min) is the least noisy signal, and therefore has the best characteristics for use as the reference station.

According to some embodiments, at the conclusion of iterative process 722, the values of SR(Present) that are greater than a given threshold may be assumed to be on a different island. According to such embodiments, method 700 may be repeated for each island in order to select a reference signal associated with each island having the best characteristics for use as a reference station.

Once the stations have been partitioned into islands and a reference signal has been selected for each island, an index may be generated by determining and storing the minimum and maximum angle values for each waveform on the island relative to the reference waveform for each of a plurality of time periods. According to certain embodiments, an index may include an entry determined by Eq. 11 and Eq. 12 for each time period.

$$\text{Index}_{min}(s) = \min(\overline{\theta_{sr}}) = \min(\theta_{s_i} - \theta_{r_i}) \qquad \text{Eq. 11}$$

$$\text{Index}_{max}(s) = \max(\overline{\theta_{sr}}) = \max(\theta_{s_i} - \theta_{r_i}) \qquad \text{Eq. 12}$$

According to certain embodiments, a value of zero may be stored for the reference waveform for the index minimum and maximum.

If $\overline{\theta_{sr}}$ has values that are near +/−180°, then the min/max operations identified in Eq. 5 and Eq. 6 may not produce a correct result. For example, if the data values include $\theta_{s_i}=+180°$ and $\theta_{r_i}=-179°$, the actual range of angles ($\theta_{sr_i}$) is only 1° degrees, but Eq. 11 and Eq. 12 will show the range to be 359°.

According to certain embodiments, it may be assumed that the separation between the maximum and minimum $\overline{\theta_{sr}}$ over a period of time encompassed within one index entry is less than 180°. In a power system, an angle exceeding 180° would result in a cycle slip. Accordingly, adjustments may be made to data values that are less than 0°. As a result of such adjustments, the difference between the maximum and minimum values in $\overline{\theta_{sr}}$ may be ensured to be less than 180°.

Figure 8A:
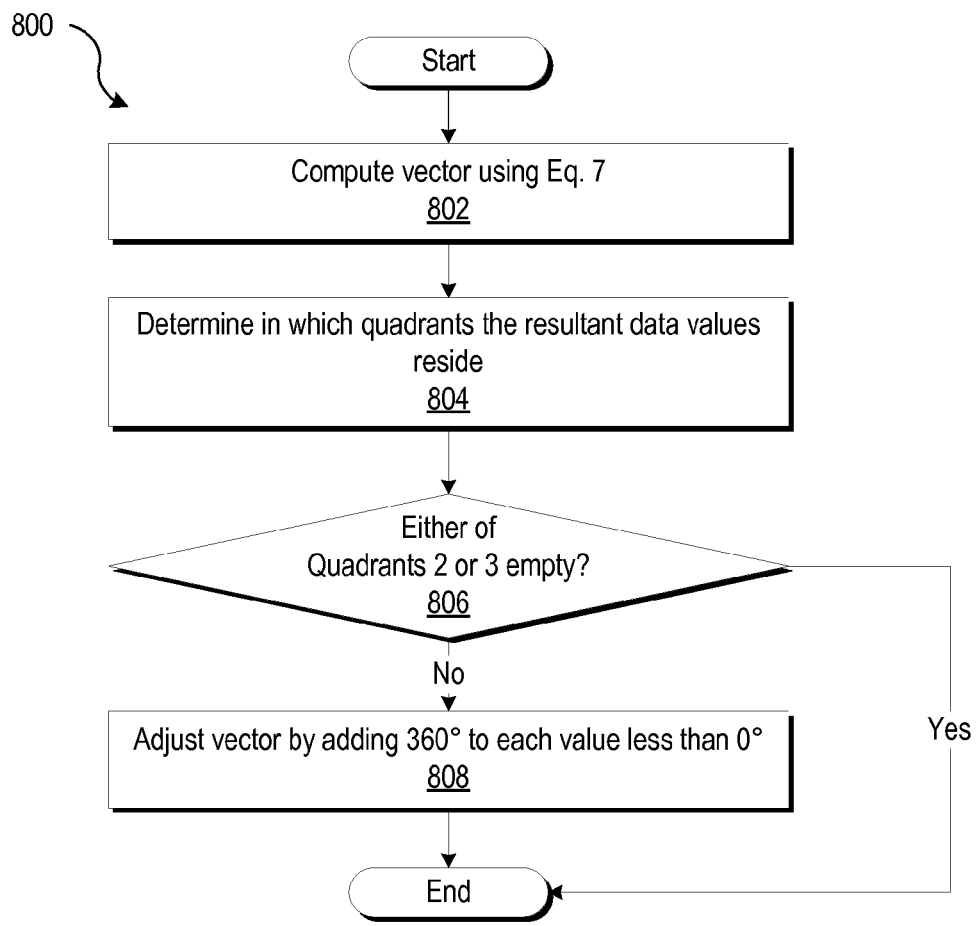
FIG. 8A illustrates one method for adjusting data values to ensure that the difference between maximum and minimum values in the array $\overline{\theta_{sr}}$ is less than 180° consistent with embodiments disclosed herein.

FIG. 8A illustrates one method for adjusting data values in order to ensure that the difference between maximum and minimum values in the array $\overline{\theta_{sr}}$ is less than 180°. At 802, an array $\overline{\theta_{sr}}$ is calculated using Eq. 7. At 804, it may be determined in which quadrants the resultant data values reside. It may be determined, at 806, whether either of quadrants 2 or 3 are empty. If so, no correction to the data may be needed. If quadrants 2 or 3 are not empty, at 808, the array may be adjusted by adding 360° to each value less than 0°.

Figure 8B:
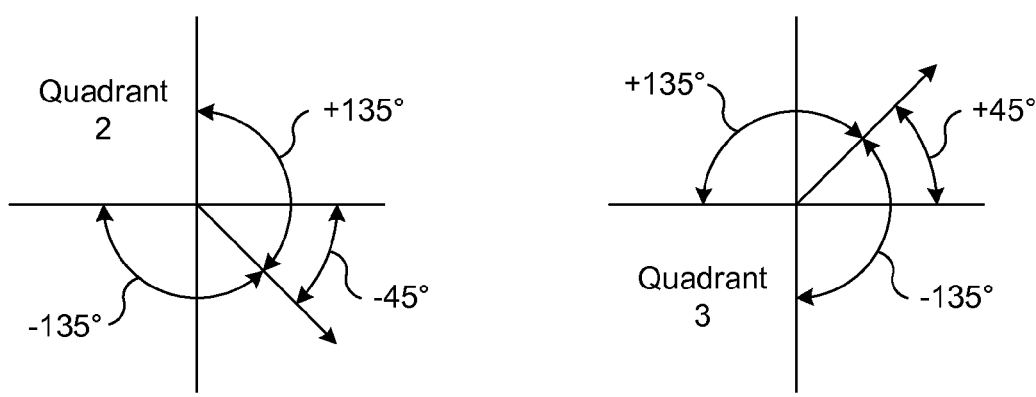
FIG. 8B illustrates two plots showing the angle ranges where resultant data values are to be found in cases where no adjustment to data values is needed to ensure that a difference between maximum and minimum values in the array $\overline{\theta_{sr}}$ is less than 180° consistent with embodiments disclosed herein.

FIG. 8B includes two plots illustrating the angle ranges where resultant data values are to be found in cases where no adjustment to data values is needed to ensure that a the difference between maximum and minimum values in the array $\overline{\theta_{sr}}$ is less than 180°. As described above, no adjustment may be made if either of quadrants two or three are empty. Accordingly, the resultant data values must either be found in the range +45°±135° or −45°±135°. As illustrated, if resultant data values are found only in the ranges +45°±135° or −45°±135°, either quadrant two or quadrant three is empty. If resultant data values are found outside of the ranges +45°±135° or −45°±135°, 360° may be added to each value less than 0° in the array computed using Eq. 7.

Figure 9:
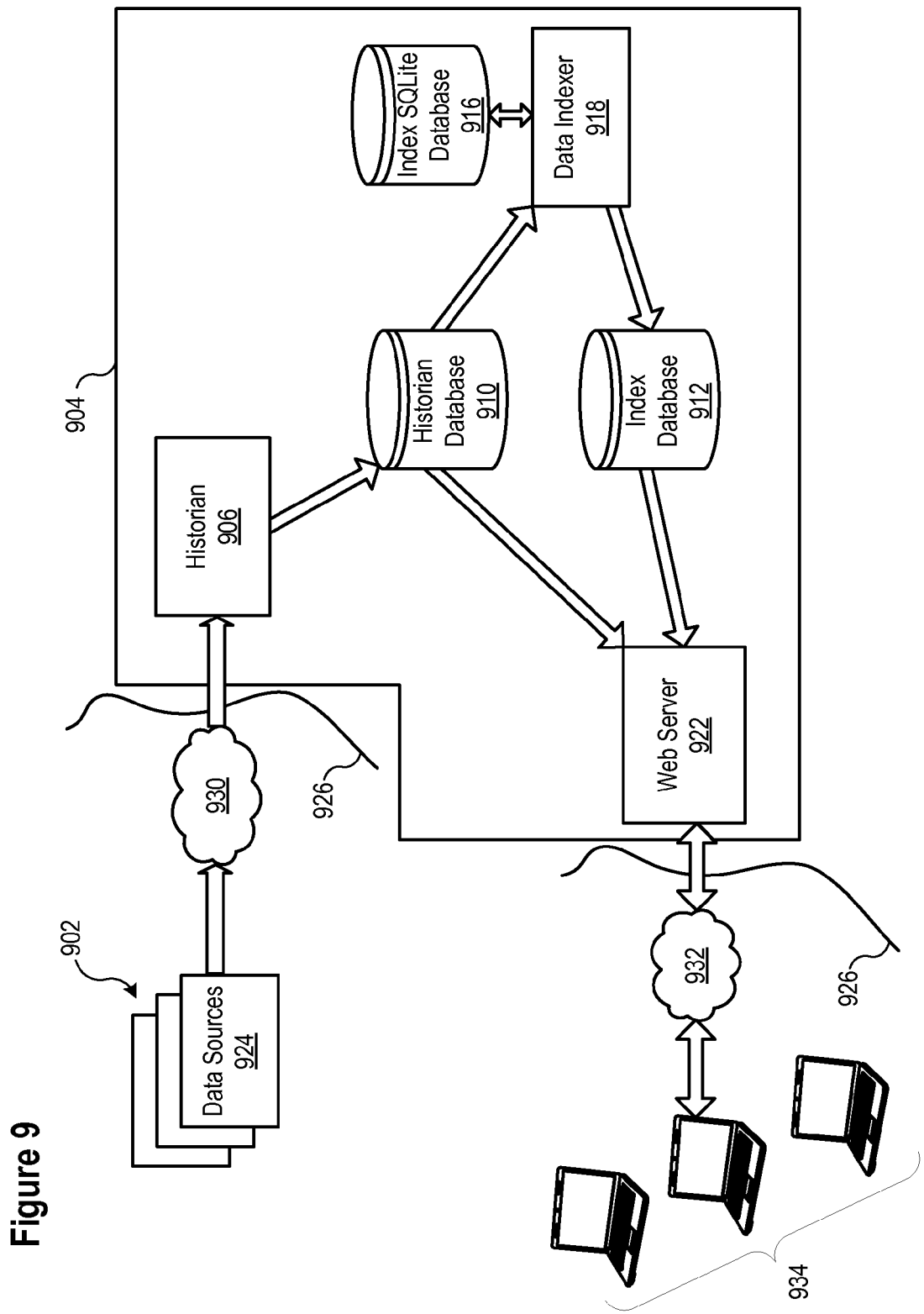
FIG. 9 illustrates one embodiment of a system architecture for creating an index or for performing a search of waveform data consistent with embodiments disclosed herein.

FIG. 9 illustrates one embodiment of a system architecture 900 for creating an index or for performing a search of waveform data consistent with embodiments disclosed herein. The data system may 904 may comprise a plurality of individual components and devices (e.g., computer servers). The embodiment illustrated in FIG. 9 may be implemented using a single server operating with a plurality of distinct roles.

According to the illustrated embodiment, data associated with an electric power distribution system may be generated by a plurality of data sources 924 and transmitted via a network 930 to a data system 904. The data may comprise synchrophasor data. The data may optionally be aggregated with one or more Phasor Data Concentrators. A firewall 926 may be disposed between a protection network 902 and the data system 904. The protection network 902 may be configured to protect and interact with the electric power distribution system. According to certain embodiments, the data may be provided according to the C37.118 standard.

A historian 906 may be configured to receive data from network 930 and relay such data to a database 910. A data indexer 918 may access database 910. Data indexer 918 may be configured to analyze the data and generate an index associated with such data. Data indexer 918 may provide the index to an index database 912. Data indexer 918 may use an index SQLite database 916 to store indexing status information.

A Web server 922 may be configured to interact with a plurality of client devices 934. According to various embodiments, Web server 922 and clients 934 may interact using a web enabled application. A Web-enabled application may be developed in a number of formats, including JavaScript, Silverlight, and the like. Web server 922 may receive data from historian database 910, and index database 912.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system configured to index data based on at least one characteristic of a plurality of waveforms associated with an electric power distribution system, comprising:
   a processor in communication with a bus;
   a non-transitory computer-readable storage medium in communication with the bus, the non-transitory computer readable storage medium comprising:
      an index module configured to generate a first index based on at least one characteristic of a plurality of waveforms, the index module configured to:
         divide each of the plurality of waveforms into a first plurality of temporal segments;
         determine at least one index value representative of the characteristic for each of the first plurality of temporal segments in each of the plurality of waveforms;
         associate the determined index value of each of the first plurality of temporal segments in each of the plurality of waveforms with a time stamp configured to identify at least one time in the plurality of waveforms based on the determined index value; and
         store the time stamp and the determined index value for each of the first plurality of temporal segments in the first index.

2. The system of claim 1, wherein the plurality of waveforms comprise synchrophasor data.

3. The system of claim 1, wherein the at least one index value comprises one of a maximum value and a minimum value within each of the plurality of temporal segments.

4. The system of claim 1, wherein the at least one characteristic comprises one of a frequency, an amplitude, and a rate of change.

5. The system of claim 1, wherein the index module is further configured to generate a second index having a plurality of overlapping temporal segments, the index module being further configured to:
   divide each of the plurality of waveforms into a second plurality of temporal segments, the second plurality of temporal segments overlapping the first plurality of temporal segments at least in part, and the first plurality of temporal segments each being longer than the second plurality of temporal segments;
   determine at least one index value associated with each of the second plurality of temporal segments for each of the plurality of waveforms;
   associate the determined index value associated with each of the second plurality of temporal segments for each of the plurality of waveforms with a time stamp; and
   store the time stamp and the determined index value for each of the second plurality of temporal segments in the second index.

6. The system of claim 5, wherein the non-transitory computer-readable storage medium further comprises a search module configured to:
   receive at least one search parameter;
   search the first index to identify search results that satisfy the at least one search parameter;
   identify a portion of the second index based on the search of the first index;
   selectively search the identified portion of the second index to identify search results that satisfy the at least one search parameter; and
   deliver search results found in the second index.

7. The system of claim 1, wherein the at least one characteristic comprises a phase angle determined with respect to a reference signal.

8. The system of claim 7, wherein the non-transitory computer readable storage medium further comprises a reference signal identification module configured to select a reference signal from among the plurality waveforms.

9. The system of claim 8, wherein the reference signal identification module is configured to complete an iterative analysis for each waveform on the list of waveforms to select the reference signal, the iterative analysis configured to:
   calculate a plurality of values corresponding to the plurality of waveforms, each of the plurality of values comprising a plurality of values representing a variance between a waveform under analysis and the reference waveform at a plurality of points in time;
   determine a maximum value of the variance in each of the plurality of values;
   determine a minimum value of the variance in each of the plurality of values;
   calculate a difference between the maximum value of the variance and the minimum value of the variance in each of the plurality of values;
   calculate a summation of the difference between the maximum value of the variance and the minimum value of the variance for each of the plurality of values;
   select the waveform with the lowest summation;
   compare the summation of the selected waveform to an established minimum value; and
   if the lowest summation is less than the established minimum value, repeat the iterative process and
      set the waveform with the lowest summation as the reference waveform in the next iteration of the iterative process, and
      set the lowest summation as the established minimum value;

if the summation is greater than the previously established minimum value,
　　select the waveform with the lowest summation as the reference signal, and
　　end the iterative process.

10. The system of claim 7, wherein the non-transitory-readable storage medium further comprises an angle adjustment module configured to:
　calculate a plurality of values corresponding to the plurality of waveforms, each of the plurality of values comprising a plurality of values representing a variance between a waveform under analysis and the reference waveform at a plurality of points in time;
　determine at least one of the plurality of values is located outside of the range of 45°±135° or −45°±135°; and
　selectively adjust each of the plurality of values by adding 360° to each value less than 0°.

11. The system of claim 1, wherein the plurality of temporal segments each have an equal length.

12. The system of claim 1, wherein the plurality of temporal segments have a variable length based on changes in the at least one characteristic.

13. The system of claim 1, wherein the index comprises a plurality of overlapping temporal segments.

14. The system of claim 1, wherein the non-transitory computer-readable storage medium further comprises a search module configured to:
　receive at least one search parameter; and
　search the index to identify search results that satisfy the at least one search parameter.

15. The system of claim 14, wherein the at least one search parameter corresponds to a phase angle between two of any of the plurality of waveforms.

16. The system of claim 14, wherein the non-transitory computer-readable storage medium further comprises an island detection module configured to determine that at least two of the plurality of waveforms are associated electrically isolated islands.

17. The system of claim 16, wherein the at least one search parameter crosses different electrically isolated islands.

18. The system of claim 16, wherein the island detection module is configured to return an invalid result in response to search parameters involving the electric power distribution system and the electrically isolated island.

19. The system of claim 1, further comprising a communications interface configured to communicate with a network, and wherein the plurality of waveforms are accessible via the network.

20. The system of claim 1, wherein the plurality of temporal segments comprise a corresponding plurality of durations based upon a quantification of an amount of variation in the characteristic during each of the temporal segments.

21. The system of claim 20, wherein the temporal segment having the greatest amount of variation in the characteristic corresponds to the temporal segment having the shortest duration.

22. The system of claim 20, wherein the temporal segment having the least amount of variation in the characteristic corresponds to the temporal segment having the longest duration.

23. A method of indexing data based on at least one characteristic of a plurality of waveforms associated with an electric power distribution system, comprising:
　dividing each of the plurality of waveforms into a first plurality of temporal segments;
　determining at least one index value representative of the characteristic for each of the first plurality of temporal segments in each of the plurality of waveforms;
　associating the determined index value of each of the first plurality of temporal segments in each of the plurality of waveforms with a time stamp configured to identify at least one time in the plurality of waveforms based on the determined index value; and
　storing the time stamp and the determined index value for each of the first plurality of temporal segments in a first index.

24. The method of claim 23, further comprising:
　dividing each of the plurality of waveforms into a second plurality of temporal segments, the second plurality of temporal segments overlapping the first plurality of temporal segments at least in part, and the first plurality of temporal segments each being longer than the second plurality of temporal segments;
　determining at least one index value associated with each of the second plurality of temporal segments for each of the plurality of waveforms;
　associating the determined index value associated with each of the second plurality of temporal segments for each of the plurality of waveforms with a time stamp; and
　storing the time stamp and the determined index value for each of the second plurality of temporal segments in a second index.

25. The method of claim 23, further comprising:
　receiving at least one search parameter; and
　searching the first index to identify search results that satisfy the at least one search parameter;
　identifying a portion of the second index based on the search of the first index;
　selectively search the identified portion of the second index to identify search results that satisfy the at least one search parameter; and
　deliver search results found in the second index.

26. The method of claim 23, further comprising selecting a reference signal by:
　calculating a plurality of values corresponding to the plurality of waveforms, each of the plurality of vectors comprising a plurality of values representing a variance between a waveform under analysis and the reference waveform at a plurality of points in time;
　determining a maximum value of the variance in each of the plurality of values;
　determining a minimum value of the variance in each of the plurality of values;
　calculating a difference between the maximum value of the variance and the minimum value of the variance in each of the plurality of values;
　calculating a summation of the difference between the maximum value of the variance and the minimum value of the variance for each of the plurality of values;
　selecting the waveform with the lowest summation;
　comparing the selected waveform with the lowest summation to an established minimum value; and
　if the lowest summation is less than the established minimum value, repeating the iterative process and
　　setting the waveform with the lowest summation as the reference waveform in the next iteration of the iterative process, and
　　setting the lowest summation as the established minimum value; or if the summation is greater than the previously established minimum value, selecting the waveform with the lowest summation as the reference signal, and ending the iterative process.

27. The method of claim 23, further comprising:
calculating a plurality of values corresponding to the plurality of waveforms, each of the plurality of values comprising a plurality of values representing a variance between a waveform under analysis and the reference waveform at a plurality of points in time;
determining at least one of the plurality of values is located outside of the range of 45°±135° or −45°±135°; and
selectively adjusting each of the plurality of values by adding 360° to each value less than 0°.

28. The method of claim 23, further comprising:
receiving at least one search parameter; and
searching the index to identify search results that satisfy the at least one search parameter.

29. The method of claim 28, wherein the at least one search parameter corresponds to a phase angle between two of any of the plurality of waveforms.

30. The method of claim 28, further comprising:
determining that two of the plurality of waveforms are associated with electrically isolated islands.

31. The method of claim 30, wherein the at least one search parameter crosses different electrically isolated islands.

32. The method of claim 30, further comprising:
returning an invalid result in response to receiving search parameters involving the electric power distribution system and the electrically isolated island.

33. A system configured to index data based on at least one characteristic of a plurality of waveforms associated with an electric power distribution system, comprising:
a processor in communication with a bus;
a non-transitory computer-readable storage medium in communication with the bus, the non-transitory computer readable storage medium comprising:
an index module configured to generate a first index based on at least one characteristic of a plurality of waveforms, the index module configured to:
divide each of the plurality of waveforms into a first plurality of temporal segments;
determine at least one index value associated with each of the first plurality of temporal segments for each of the plurality of waveforms;
associate the determined index value associated with each of the first plurality of temporal segments for each of the plurality of waveforms with a time stamp;
store the time stamp and the determined index value for each of the first plurality of temporal segments in the first index;
divide each of the plurality of waveforms into a second plurality of temporal segments, the second plurality of temporal segments overlapping the first plurality of temporal segments at least in part, and the first plurality of temporal segments each being longer than the second plurality of temporal segments;
determine at least one index value associated with each of the second plurality of temporal segments for each of the plurality of waveforms;
associate the determined index value associated with each of the second plurality of temporal segments for each of the plurality of waveforms with a time stamp; and
store the time stamp and the determined index value for each of the second plurality of temporal segments in the second index.

* * * * *

UNITED STATES PATENT AND TRADEMARK OFFICE
CERTIFICATE OF CORRECTION

PATENT NO. : 8,880,368 B2
APPLICATION NO. : 13/795586
DATED : November 4, 2014
INVENTOR(S) : Eric J. Hewitt, Gregary C. Zweigle and Stanley P. Gotshall It is certified that error appears in the above-identified patent and that said Letters Patent is hereby corrected as shown below:

Title Page Item (72), Inventors: change "Gregory C. Zweigle" to "Gregary C. Zweigle"

Signed and Sealed this
Seventeenth Day of February, 2015

Michelle K. Lee
*Deputy Director of the United States Patent and Trademark Office*